(12) United States Patent
Meier et al.

(10) Patent No.: US 8,224,749 B2
(45) Date of Patent: *Jul. 17, 2012

(54) METHODS AND SYSTEMS FOR AUTOMATED GENERATION OF BILLS

(75) Inventors: Beat Meier, Hedingen (CH); Peter Goedtler, Zurich (CH)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/222,222

(22) Filed: Aug. 31, 2011

(65) Prior Publication Data

US 2011/0313904 A1    Dec. 22, 2011

Related U.S. Application Data

(63) Continuation of application No. 12/790,003, filed on May 28, 2010, now Pat. No. 8,032,458, which is a continuation of application No. 10/651,545, filed on Aug. 29, 2003, now Pat. No. 7,761,377.

(60) Provisional application No. 60/406,986, filed on Aug. 30, 2002.

(30) Foreign Application Priority Data

| Nov. 29, 2002 | (DE) | 102 56 152 |
| Dec. 3, 2002 | (EP) | 02027089 |
| Dec. 3, 2002 | (EP) | 02027090 |

(51) Int. Cl.
*G07F 19/00* (2006.01)

(52) U.S. Cl. ............................. 705/40; 705/34

(58) Field of Classification Search ............ 705/34, 705/40

See application file for complete search history.

(56) References Cited

U.S. PATENT DOCUMENTS 4,727,243 A    2/1988    Savar
(Continued)

FOREIGN PATENT DOCUMENTS

CA    2597150 A1    6/1999
(Continued)

OTHER PUBLICATIONS

Oracle Announces Oracle Internet Bill & Pay 1.0, a Robust andComprehensive Electronic Bill Presentment & Payment Solution PR Newswire. New York: Dec. 2, 1998. p. 1 Dateline: California, Nevada Publication title: PR Newswire. New York:Dec. 2, 1998. 6.*

(Continued)

*Primary Examiner* — William Rankins

(74) *Attorney, Agent, or Firm* — Finnegan, Henderson, Farabow, Garrett & Dunner, LLP

(57) ABSTRACT

The present invention provides methods and systems for processing bills electronically. Generally, a bill is created for a customer using billing information and master data from a biller and master data from a customer. Billing information is received from the biller by a first processing module having access to the master data of the biller. The first processing module generates a bill using the billing information and the master data of the biller. A second processing module having access to the master data of the customer provides customer data to the first processing module. The bill is transformed into a format specified in the master data of the customer by the first processing module if the format of the generated bill is not the format specified in the master data of the customer. The generated or transformed bill is transferred to the second processing module by the first processing module.

20 Claims, 13 Drawing Sheets

U.S. PATENT DOCUMENTS

| | | | |
|---|---|---|---|
| 5,202,977 | A | 4/1993 | Pasetes, Jr. et al. |
| 5,483,445 | A | 1/1996 | Pickering |
| 5,557,780 | A | 9/1996 | Edwards et al. |
| 5,649,117 | A * | 7/1997 | Landry .......................... 705/40 |
| 5,708,828 | A | 1/1998 | Coleman |
| 5,715,397 | A | 2/1998 | Ogawa et al. |
| 5,909,570 | A | 6/1999 | Webber |
| 5,920,847 | A | 7/1999 | Kolling et al. |
| 5,963,925 | A | 10/1999 | Kolling et al. |
| 6,039,245 | A | 3/2000 | Symonds et al. |
| 6,070,150 | A | 5/2000 | Remington et al. |
| 6,304,857 | B1 * | 10/2001 | Heindel et al. ................. 705/34 |
| 6,385,595 | B1 | 5/2002 | Kolling et al. |
| 6,542,913 | B1 | 4/2003 | Deriso et al. |
| 7,236,950 | B2 | 6/2007 | Savage et al. |
| 2002/0010666 | A1 * | 1/2002 | Wright ............................ 705/34 |
| 2002/0067723 | A1 * | 6/2002 | Falys et al. .................... 370/389 |
| 2002/0077977 | A1 | 6/2002 | Neely et al. |
| 2002/0184145 | A1 | 12/2002 | Sijacic et al. |
| 2003/0191701 | A1 * | 10/2003 | Haseltine et al. .............. 705/34 |
| 2004/0019561 | A1 * | 1/2004 | Isturiz et al. ................... 705/40 |
| 2004/0024665 | A1 | 2/2004 | Foster |
| 2004/0143548 | A1 | 7/2004 | Meier et al. |
| 2005/0010523 | A1 * | 1/2005 | Myklebust et al. ............ 705/40 |
| 2005/0197957 | A1 | 9/2005 | Keith et al. |

FOREIGN PATENT DOCUMENTS

| | | |
|---|---|---|
| DE | 4402856 A1 | 8/1995 |
| DE | 19801563 A | 7/1999 |
| EP | 1 220 114 A | 7/2002 |
| WO | WO 99/21330 | 4/1999 |
| WO | WO 99/37070 | 7/1999 |
| WO | WO 00/48102 | 8/2000 |

OTHER PUBLICATIONS

E-bills arrive Greoory Dalton. Informationweek. Manhasset: Apr. 19, 1999. , Iss. 730.*

BoldFish Innovates Email Delivery Service for Electronic Bill Presentment and Payment Market, PR Newswire, New York, Jan. 29, 2001.

On heterogeneous database retrieval: A cognitively guided approach, Ramayya Krishnan, Xiaoping Li, David Steier, J. Leon Zhao, Information System Research, Linthicum Sep. 2001, vol. 12, Issue 3, p. 286.

PayNet, V3.10, Manual—Message definitions for Biller/Customer, Mar. 1, 2001, pp. 1-545.

PayNet, V3.10, Manual—System description, Mar. 1, 2001, pp. 1-149.

Proposal for a Council Directive amending Directive 77/388/EEC with a view to simplifying, modernising and harmonising the conditions laid down for Invoicing in respect of value added tax, Commission of the European Communities COM(2000) 650 final, 2000/0289 (CNS), Brussels, Nov. 17, 2000, pp. 1-21.

The on-line billing & payment race, Doug Tangwall, Credit Union Executive Journal, Madison: Nov./Dec. 1999, vol. 39, Issue 6, p. 6, 6 pages.

Unknown, MBNA Account Access Overview, Jun. 3, 2001, one page.

Unknown, The Bank Credit Card Business, The American Bankers Association, 1996, p. 83.

Oracle Announces Oracle Internet Bill & Pay 1.0, a Robust and Comprehensive Electronic Bill Presentment & Payment Solution PR Newswire, New York: Dec. 2, 1998. p. 1 Dateline: California, Nevada Publication title: PR Newswire. New York: Dec 2. 1998. 6.

E-bills arrive Gregory Dalton. Informationweek. Manhasset: Apr. 19, 1999. Iss. 730.

* cited by examiner

METHODS AND SYSTEMS FOR AUTOMATED GENERATION OF BILLS

RELATED APPLICATIONS

This U.S. patent application is a continuation of U.S. patent application Ser. No. 12/790,003, filed May 28, 2010, now U.S. Pat. No. 8,032,458 which is a continuation of U.S. patent application Ser. No. 10/651,545, filed Aug. 29, 2003, now U.S. Pat. No. 7,761,377, which claims the benefit of U.S. Provisional Patent Application No. 60/406,986, filed Aug. 30, 2002, European Patent Application No. 02027089.8 filed Dec. 3, 2002, European Patent Application No. 02027090.6 filed Dec. 3, 2002, and German Patent Application No. 10256152.4 filed Nov. 29, 2002, all of which are incorporated herein by reference.

FIELD OF THE INVENTION

The technical field of this invention is electronic data processing. More particularly, the invention relates to methods, computer programs, computer program products, and systems for automated billing systems and, still more particularly, for processing, generating and presenting an electronic invoice to a customer for remote review and payment.

DESCRIPTION OF THE RELATED ART

It should be understood that the term "presentment" as used herein does not include the specialized definition normally associated with commercial paper, i.e. the production on a negotiable instrument to a drawee. Rather, the term refers to providing via electronic means information, particularly an "invoice," containing at least the same customer billing data typically included on a paper invoice. This electronic presentment may preferably, but not exclusively, take place through the use of an internet- or intranet website or via email or SMS, such as, for example, by making a web site accessible to one or more persons. It may further take place by sending computer-readable storage media, like disks, ZIP disks, magneto-optical disks, CD-, CDRW-, DVD ROMs or other similar materials via standard mail.

There exist many known methods and systems for electronic bill presentment and payment (EBPP) in enterprise resource planning (ERP) software environments. For example, U.S. Pat. No. 6,044,362 discloses a system for automated electronic invoicing and payment for providing remote customer review of automated billing from an invoicer. The system includes invoice presentment electronics having a control system and first communication electronics. The system also includes at least one remote authorization terminal having a customer interface, the terminal having second communication electronics adapted to operatively communicate with the first communication electronics. The control system of the invoice presentment electronics is adapted to provide billing data, regarding a customer invoice preauthorized for automated billing, to the first communication electronics for transmission to the second communication electronics. The customer interface of the remote authorization terminal is adapted to present the billing data to a customer and to receive a response relating to the billing data from the customer, the response indicating one of acceptance of the billing data for automated billing or modification of the billing data for modifying automated billing. Acceptance can either be an active response from the customer or a passive response such as, for example, automatic acceptance up to a preset limit.

U.S. Pat. No. 5,465,206 discloses a bill pay system wherein participating customers pay bills to participating billers through a payment network operating according to preset rules. The participating customers receive bills from participating billers of (paper/mail bills, e-mail notices, implied bills for automatic debts) which indicate an amount, and a unique biller identification number. To authorize a remittance, a customer transmits to its bank (a participating bank) a bill pay order indicating a payment date, a payment amount, the customer's account number with the biller, a source for the funds, and the biller's biller identification number, either directly or by reference to static data containing those data elements. The bank then submits a payment message to a payment network, and the payment network, which assigns the biller reference numbers, forwards the payment message to the biller's bank. For settlement, the customer's bank debits the customer's account and is obligated to a net position with the payment network; likewise, the biller's bank receives a net position from the payment network and credits the biller's bank account. If the customer's bank agrees to send non-reversible payment messages, the customer's bank does not submit the transaction until funds are good unless the customer's bank is willing to take the risk of loss if funds are not good, such as in the case of a guaranteed payment network. The biller's bank, upon receipt of the payment message, releases the funds to the biller, and provides A/R data to biller in a form which the biller has indicated, the form being one which does not have to be treated as an exception item to the biller. The biller's bank is assured of payment by the payment network, unless the transaction is a reversible transaction according to the preset rules of the payment network. In specific embodiments, the customer initiates the bill pay orders manually, via paper at an ATM, via PC, or via telephone keypad.

Another system is known from the website www://ofx.net. Open Financial Exchange (ofx) is a broad-based framework for exchanging financial data and instructions between customers and their financial institutions. It allows institutions to connect directly to their customers without requiring an intermediary. Open Financial Exchange is an open specification that anyone can implement: any financial institution, transaction processor, software developer, or other party. It uses widely accepted open standards for data formatting (such as XML), connectivity (such as TCP/IP and HTTP), and security (such as SSL). Open Financial Exchange defines the request and response messages used by each financial service as well as the common framework and infrastructure to support the communication of those messages. The data of biller and customer are held in the same system.

In systems that use a direct contact between biller and customer, however, it is difficult to technically implement a business scenario in which bills of different billers are presented to one customer. Further, it is difficult to integrate and maintain such systems in the IT (information technology) systems of billers and customers, particularly if a high bill volume has to be handled.

Thus, there is a need for a method, software application, and/or data processing system that provide a more efficient solution to some or all of the problems described above, that is, methods and systems for more efficient bill processing.

SUMMARY OF THE INVENTION

In accordance with the present invention, as embodied and broadly described herein, methods and systems consistent with the principles of the invention provide a method for processing bills electronically, wherein a bill is created for a customer using billing information and master data from a biller and master data from a customer. Billing information is received from the biller by a first processing module having access to the master data of the biller. A bill is generated by the first processing module using the billing information and the master data of the biller. A second processing module having access to the master data of the customer is requested to provide customer data to the first processing module. The bill is transformed into a format specified in the master data of the customer by the first processing module if the format of the generated bill is not the format specified in the master data of the customer. The generated or transformed bill is transferred to the second processing module by the first processing module.

Another aspect of the invention is to provide a computer system for processing bills electronically, wherein a bill is created for a customer using billing information and master data from a biller and master data from a customer. A computer system consistent with the present invention comprises a memory having program instructions, an input means for receiving and entering data, an output means for sending and presenting data, a storage means for storing data, and a processor responsive to the program instructions. The processor receives the billing information from the biller by a first processing module having access to the master data of the biller and generates a bill by the first processing module using the billing information and the master data of the biller. The processor also requests data of the customer from a second processing module having access to the master data of the customer by the first processing module and transforms the bill into a format specified in the master data of the customer by the first processing module if the format of the generated bill is not the format specified in the master data of the customer. The processor also transfers the generated or transformed bill to the second processing module by the first processing module.

Methods and systems consistent with the present invention provide solutions for providing a large amount of bills in an efficient way to a specific customer. A plurality of billers can provide their billing information to the first module. The billing information is transformed into a bill in a format specified by the respective customer.

The present invention is further directed to a computer system, a computer program, a computer-readable medium and a carrier signal, each comprising program code or instructions for processing bills according to the inventive method and in its embodiments.

Each of the processing modules may be installed as computer programs on different hardware systems (computers or computer systems), and run separately and independently of each other. The different systems may be connected in the form of a network to communicate with each other. In addition, one or more of the processing modules may be a part of (integrated in) another processing module.

Additional objects and advantages of the invention and its embodiments will be set forth in part in the description, or may be learned by practice. It is understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, explain the principles of the invention. In the drawings.

DETAILED DESCRIPTION

Figure 1:
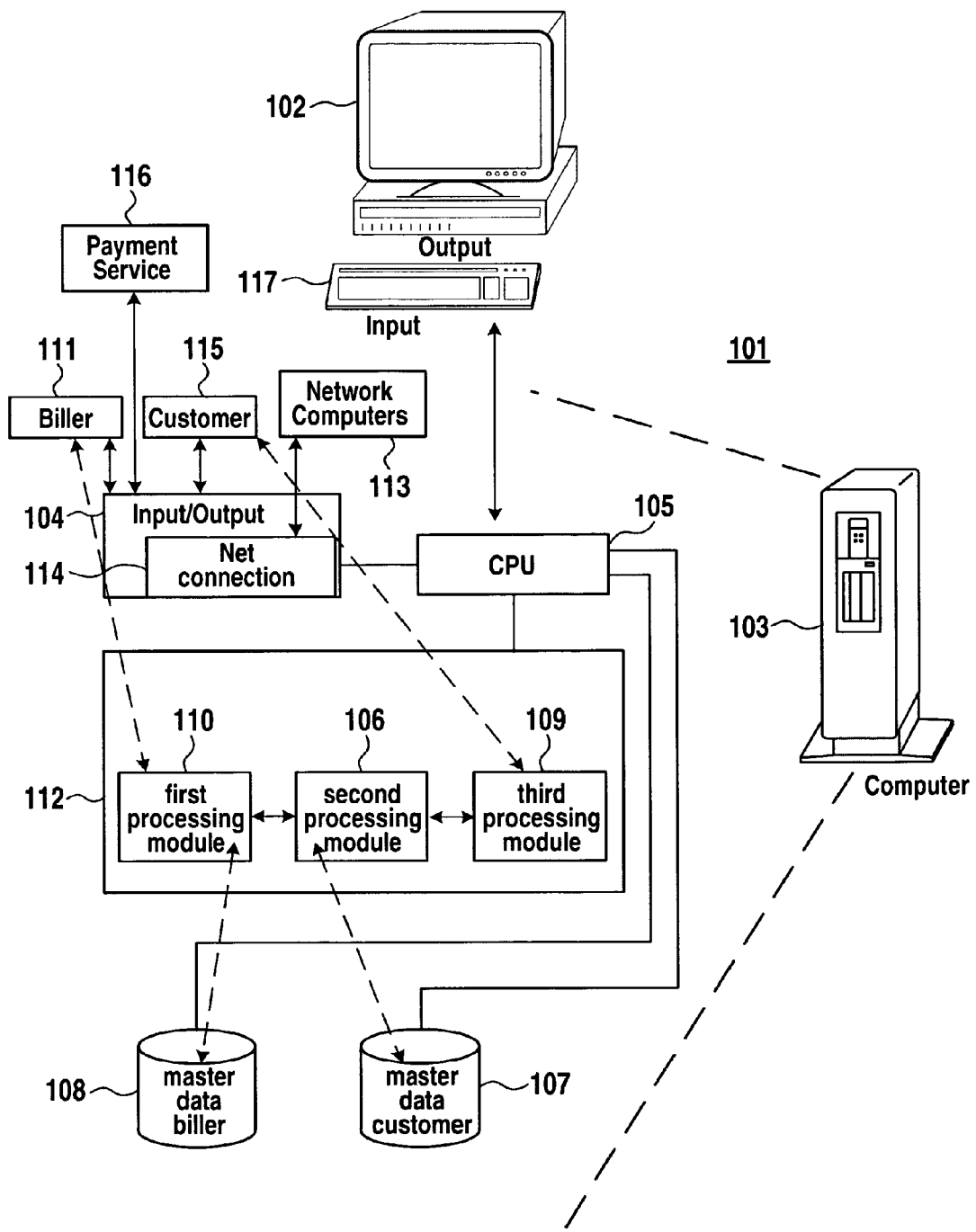
FIG. 1 is a schematic block diagram of one exemplary implementation of the inventive method within a computer system.

Computer systems and the programs that control them are closely related. As used herein, phrases such as "the computer provides," "the program provides or performs specific actions", and "a user performs a specific action" are used to describe actions by a computer system that are controlled by a program or to indicate that the program or program module is designed to enable the computer system to perform the specific action or to enable a user to perform the specific action by a computer system. A computer system can be a stand-alone computer, such as a PC or a laptop, or a series of computers connected as a network, such as a network within a company or a series of computers connected via the internee.

Processors suitable for execution of a computer program consistent with the present invention include, by way of example, both general and special-purpose microprocessors, and any one or more processors of any kind of digital computer. Generally, a processor will receive instructions and data from a read-only memory or a random access memory or both. Generally, a computer comprises a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD- ROM and DVD-ROM disks. The processor and the memory can be supplemented by, or incorporated in, ASICs (application-specific integrated circuits).

To provide for interaction with a user, the present invention can be implemented on a computer having a display device such as a CRT (cathode ray tube) or LCD (liquid crystal display) monitor for displaying information to the user and a keyboard and a pointing device, such as a mouse or a trackball, by which the user can provide input to the computer. Other kinds of devices can be used to provide for interaction with a user as well. For example, feedback may be provided to the user in the form of sensory feedback, such as visual feedback, auditory feedback, or haptic feedback; and input from the user can be received in any form, including acoustic, speech, or haptic input.

Reference will now be made in detail to the principles of the invention by explaining the invention as a data processing process, examples of which are illustrated in the accompanying drawings. The examples mentioned herein are intended to explain the invention and not to limit the invention in any kind.

The first processing module is hereinafter referred to as "biller service provider" (BSP), the second as "consolidator," and the third as the "customer service provider" (CSP). If the CSP is integrated in the consolidator, the resulting combination is referred to as "integrated CSP" (iCSP).

FIG. 1 depicts one exemplary implementation of an embodiment of the invention, that is, a computer system with program modules for performing the inventive method. FIG. 1 shows a computer system 101 comprising a computer 103 having a CPU 105, a working storage 112 (memory), in which software applications are stored for processing by CPU 105. The software applications comprise program modules 110, 106, 109 for carrying out the first, second and third processing modules, respectively, according to the inventive method.

Computer system 101 may further comprise input means 117, output means 102 for interaction with a user, such as for starting the program modules and/or for data input, and general input/output means 104, including a net connection 114, for sending and receiving data, such as data on billing information, bills, payment orders, customer and biller master data. A plurality of computer systems 101 can be connected via net connection 114 in the form of a network 113. In such a case, each of the modules 106,109,110 may be installed and run separately and/or independently on the respective network computers 113. In this case, the network computers 113 can be used as further input/output means, including as storage locations. Computer system 103 may further comprise a first storage means 107, in which master data of the customer may be stored, and a second storage means 108, in which the master data of the biller may be stored.

In at least one embodiment of the present invention, first processing module 110 (BSP) has access to the master data of the biller stored on storage means 108, and the second processing module 106 (consolidator) has access to the master data of the customer stored on the storage means 107. A biller 111 and a customer 115 may be connected, permanently or on an as-needed basis, to computer system 103 via input/output means 104. A further connection may be established to a payment service 116. The interactions of biller 111 and customer 115 with the accompanying program modules 110, 109, respectively, are indicated by dashed arrows as is the affiliation of the BSP and the consolidator to the respective storage means 108, 107.

Figure 2:
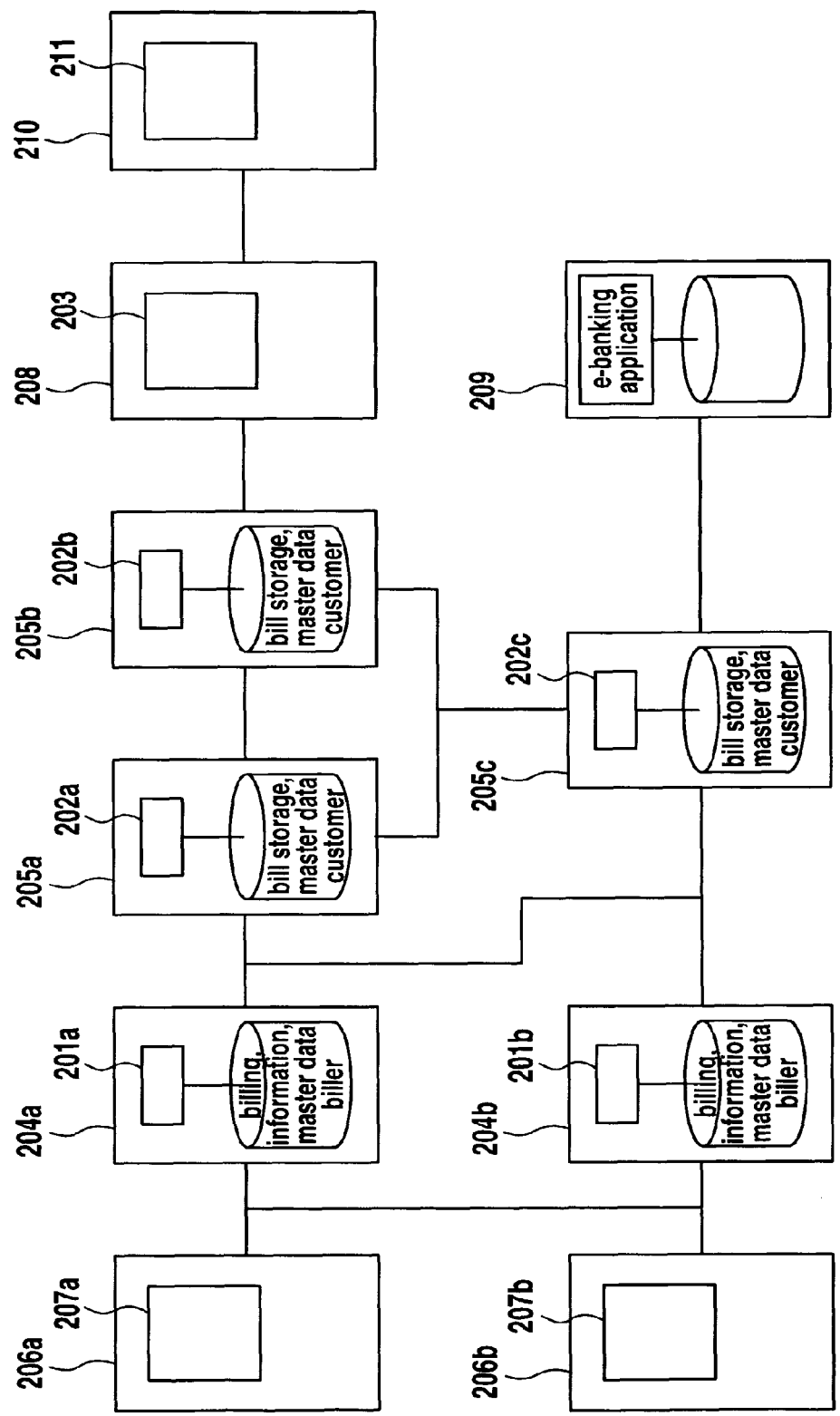
FIG. 2 is an block diagram of one exemplary implementation of the inventive method.

FIG. 2 illustrates one example of a network connection of several program modules of BSPs 201a, 201b, consolidators 202a, 202b, 202c, and a CSP 203, each of which is installed on a separate computer system 204a,b, 205a,b,c and 208. The respective computer systems may be identical or different from each other, depending on the requirements of the application case. The computer systems may be located in different countries in the world. One or more billers can have access to that network via computer systems 206a,b by, for example, using web browsers 207a,b. These computer systems 206a,b may be connected to each of the BSPs 204a,b. A customer can have access to the network via a computer system 210 having a web browser 211. For performing the payments associated with the bills, an computer system 209 of a payment service provider having an e-banking application may be connected to one or more of the consolidator systems 205a,b,c.

According to the inventive concept of separating the biller master data from the customer master data, as many BSPs as necessary can be connected to one consolidator. This avoids superfluous movement of data, because the customer master data need not be shifted or copied to the module which processes the bills, as would be necessary using most prior art methods. With this concept, billing volumes of over several million bills per month can be handled by using several BSPs connected to one consolidator, for example. If customer master data needs to be updated, only the data base of the consolidator needs to be changed in systems consistent with the present invention. The BSP data base is not affected by such an update. A further effect is that, in most if not all applications, maintenance costs for the master data are reduced.

Figure 3:
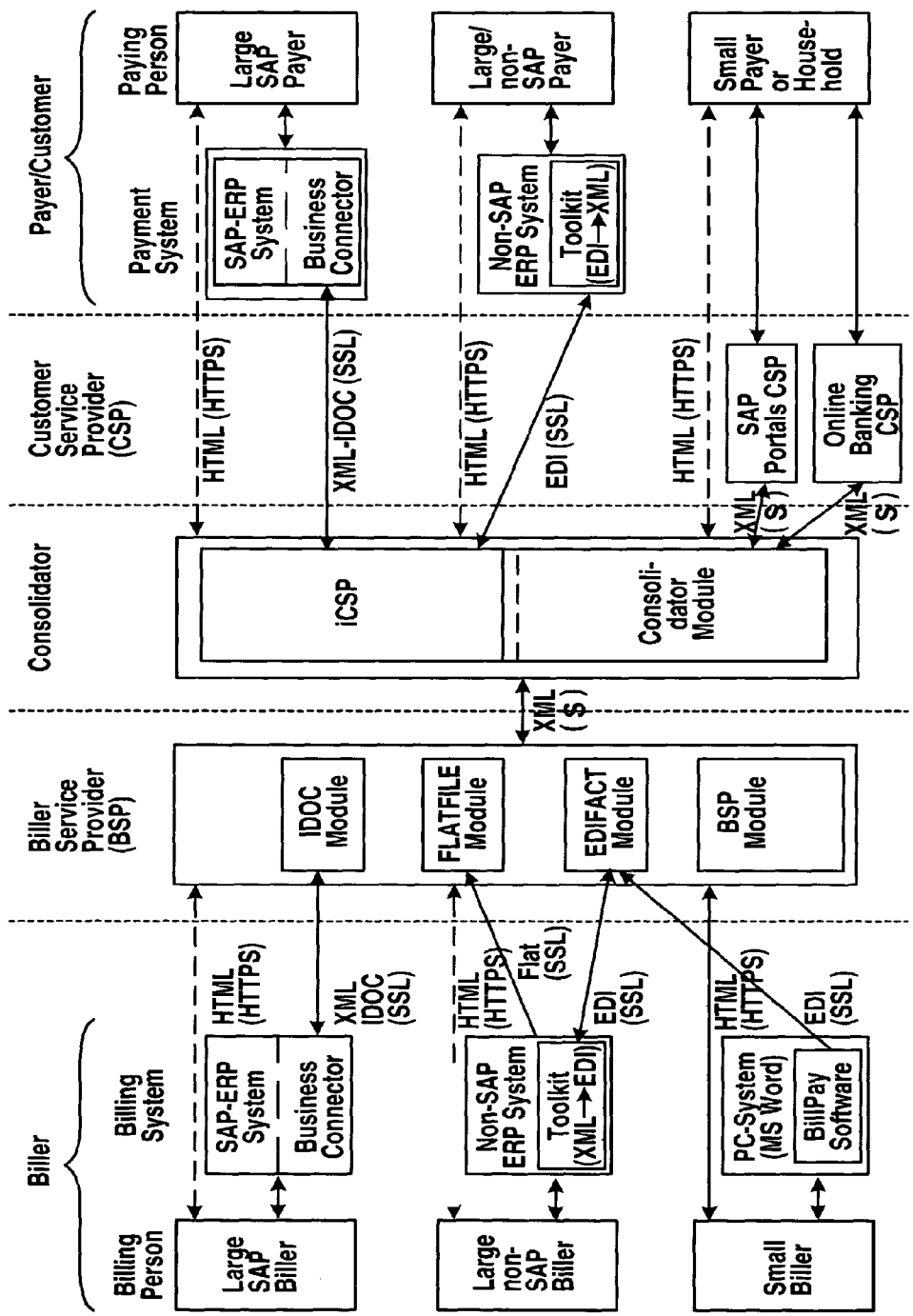
FIG. 3 shows an overview of an example of an inventive electronic bill presentment and paying system consistent with the present invention.

FIG. 3 provides an overview of possible formats and interfaces for the data exchange between a biller and the BSP, the BSP and the consolidator, the consolidator and the CSP, and between the CSP and a customer (payer). As shown in FIG. 3, the biller side may be split into three cases: Large billers using an SAP ERP system (such as one provided by SAP AG, D-69190 Walldorf, Germany), large billers using a non-SAP ERP system, and small billers. In this example, the terms "large" and "small" refer to the turnover of the respective company or person and is meant to be exemplary. The same cases may be found on the customer side. In FIG. 3, the CSP is shown in the example for large payers integrated in the consolidator as iCSP and for the small payers it is a separate program module with two alternative implementations, SAP Portals CSP and Online Banking CSP.

In this example, the BSP supports four formats for the billing information: the IDOC, FLATFILE, EDIFACT, and a predefinable BSP format on which the systems of the biller and the BSP have to be adapted during the installation of the respective software. The systems in the biller side may communicate with the BSP using, for example, HTML, HTTPS, XML-IDOC (SSL), FLAT (SSL), EDI (SSL). The BSP and the consolidator may communicate via XML, as well as consolidator and CSP. The CSP and/or iCSP may communicate with the systems of the customer using, for example, HTML (HTTPS), XML-IDOC (SSL), EDI (SSL) and XML.

Figure 4:
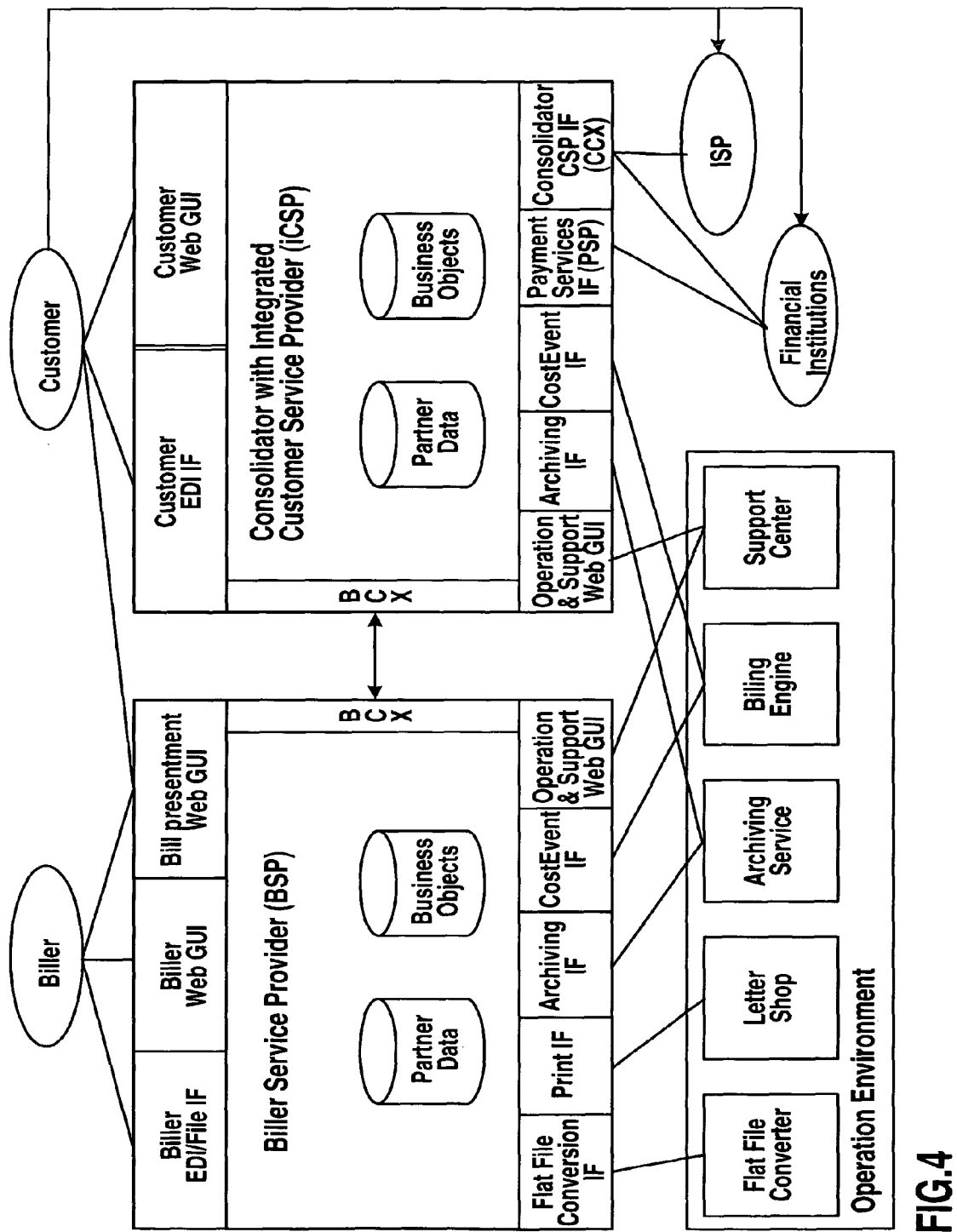
FIG. 4 is a block diagram of one exemplary interconnection of a first and second processing module.

FIG. 4 shows an example of possible interfaces (IF) with which the BSP and/or CSP and/or iCSP may be provided: a biller or customer EDI/file IF, Web GUI (graphical user interface), BCX, Flat File Conversion, Print IF, Archiving IF, a Cost Event IF for connection with a billing engine, an IF for connection with a payment service (financial institution) or a CCX IF for connection with an internet service provider (ISP). In order to view its list of bill summaries, the biller can connect to the BSP. The customer can connect directly to the CSP/iCSP or indirectly via a connection to financial institutions or ISPs. For itemized bills and registration, the customers may connect to the BSP.

The BSP may store all data associated with the biller in a partner data base. The partner data base may include, for example, master data of the billers comprising addresses, identification keys, authorizations, biller's integration level (interfacing capabilities and implemented processes), logos, location of the logos on the bill, advertisement forms for personalized promotions, formats for credits, digital signatures, etc. The billing information, the generated and/or transformed bills, and bill details for web presentment may be stored, for example, by the BSP in a business object data base. A business object in this sense may comprise all data belonging to a business transaction that is the cause for the specific bill. Typical billing information comprises, for example, the article, type of article, article number, number of the articles, position, ID, description of article, price, tax information, addresses (such as for delivery), references (URLs for details), dates (such as billing, shipping, or receipt date) etc.

The consolidator/iCSP may store all data associated with the customer and the financial institutions in a partner data base. For example, the partner data base may comprise master data of the customer including the customer's address, addresses for communication within the customer's organization and between the customer and the biller, a format in which the bill shall be presented, addresses for providing status information, dispute results, or review management, identification keys, authorizations, digital signatures, etc. Consolidated or aggregated bills or bill summaries to be presented to the customer may be stored by the consolidator/iCSP in a consolidator's business object data base. As many BSPs as necessary to handle the bill volume may be connected to a consolidator/iCSP in such a way.

In at least one exemplary embodiment, program modules 106, 109, 110 are processed by CPU 105 in FIG. 1 in order to carry out the inventive method. In this example, steps as described in the following section may be performed by the computer system 101 or the systems of the network as described above.

Figure 5:
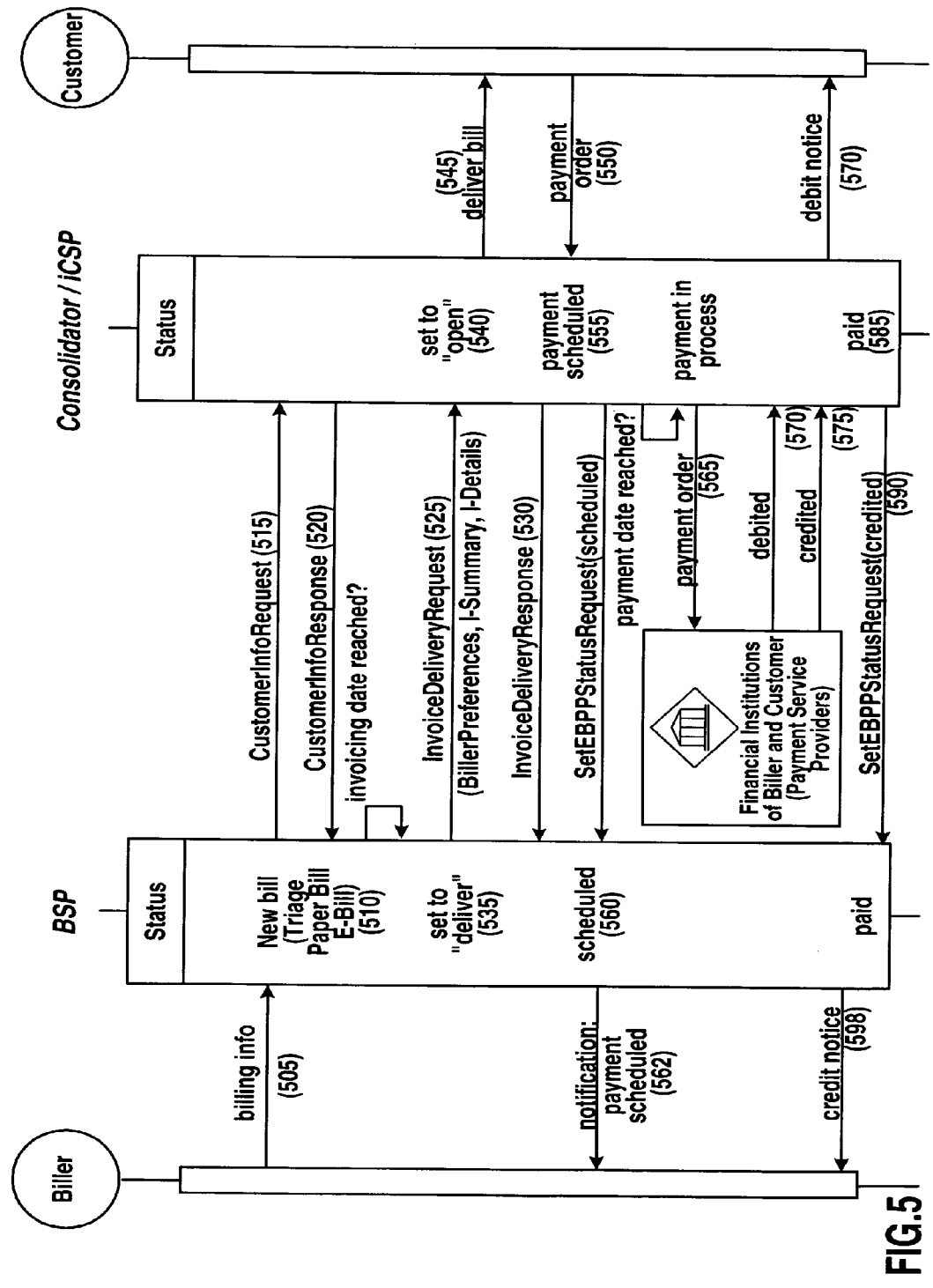
FIG. 5 is a flow diagram of one exemplary inventive billing process consistent with the present invention.

FIG. 5 shows a flow diagram of an exemplary implementation of an inventive process. The time axis in FIG. 5 runs from top to bottom. As shown in FIG. 5, a biller may send billing information to the BSP (step 505). The biller may send such information using an ERP computer system. The biller may also send the billing information in a format agreed upon when the biller registered with the BSP. The BSP may create a bill and assign a status of "new" to that object (step 510). The new bill may be created based on the received billing information, the biller's master data, or a combination thereof. The new bill may be in paper or electronic form.

The BSP may then send a request for information about the customer (CustomerInfoRequest) to the Consolidator/iCSP (step 515). The consolidator/iCSP may respond to that request and return to the BSP available data from the customer master data base for the inquired customer (CustomerInfoResponse) (step 520). In addition to the information given above, the response may contain other information, such as whether a customer requests billing data for web presentment (so-called "thin" consolidation because only the main information is presented to the customer), for processing in an ERP system (also called "thick" consolidation because the bill sent electronically to the customer includes bill details), in a digitally-signed format according to applicable tax or other legal regulations, or in an encrypted format. In at least one embodiment, the response may contain information on the biller-to-customer relationship (BCR) regarding their respective IDs in their respective ERP systems. In at least one embodiment, the response may contain authentication information for accessing itemized bills or for encryption (such as a list of digital IDs, distinguished names, certificate serial numbers, or other information referencing X.509 certificates).

The BSP may then transform the bill into the format received with the CustomerInfoResponse. In certain embodiments, it is recommended that data be converted from the source to the destination format as close to the source as possible. If possible, conversions should be avoided, as conversions generally increase the risk of data loss. In certain embodiments, a BSP may use external conversion services. A BSP may use external conversion services if, for example, a destination format can not be produced internally or if using external conversion services is otherwise advantageous. For example, a BSP may choose to use external conversion services if doing so allows the BSP to digitally sign the bills in a manner conforming to government regulations for VAT deductions. The customer may directly process and archive the invoice in one simple integrated process. In certain embodiments, the present invention may allow application content to be preserved easier. In addition, if the total number of supported formats is small, the amount of transformation work and costs may be reduced. Adaptations to accommodate differences between the specific formats required by each Payment Service Providers (PSP) can be handled in the consolidator/iCSP.

In conventional EBPP systems, conversion is often done indirectly using an intermediate ("in-house") format. Source data is first converted into the in house format and then converted into the destination format. Using this technique, the number of conversions is linear (2n) with respect to the number of formats (n), compared to n(n−1) conversions in the case of direct conversions. However, even though an intermediate format can also be used in the conversion on the present BSP, the conversion to the customer format should happen as early as possible in the presentment process.

By converting the invoice to the end user format at the BSP, the bill can be signed at the BSP. If the payment formats are converted to Biller and Customer formats on the consolidator, only the consolidator will need knowledge of the various payment formats required by each PSP. The BSP and CSP may remain independent of payment formats.

If implemented on a hardware system of a third party, the BSP may be considered an outsourcing partner of the biller, which may be advantageous in certain situations. Similarly, implementing the CSP and/or the consolidator/iCSP on third party hardware may also be advantageous in certain situations. In certain embodiments, for example, the BSP may produce the bills (electronic and/or paper) on behalf of the biller. If necessary, the biller as a legal entity may need to assign the right to digitally sign bills to the legal entity that operates the BSP. The BSP may then be responsible for producing a digitally-signed invoice message in a format accepted, readable, and processable by the customer and valid for VAT deduction. This is achieved by, for example, using the conversion process described above.

In certain embodiments, the customer may check to see that the BSP has the authority for issuing invoices on behalf of the biller. For example, a list of billers (see Customer Registration for E-Bills) may be posted on the Internet with hyperlinks to one or more documents that indicate that the BSP has the necessary authority. For added security, the documents may be digitally signed by the biller.

In many European countries, until recently, customers has to present to authorities a paper invoice in order to obtain a refund of VAT (Value Added Tax) for purchased goods. The invoice document had to be printed by the biller and contain certain required information. Other forms of invoices, such as electronically transferred bills printed by the customer, were not accepted. In the European Union and other countries (such as Switzerland), new laws and regulations allow VAT deduction on electronically transmitted bills, if they are digitally signed by the biller. The certificate and the procedure used for signing are regulated.

In order to generate an invoice in the requested format, the BSP may have access to external conversion services such as, for example, a web service. In this case, the bill to be presented to the customer may be prepared by the external conversion services. If the customer cannot be reached electronically, that is, for example, if the CustomerInfoResponse returns "unknown", the BSP can generate a paper bill and/or inform the biller accordingly.

Each invoice may be associated with an invoice delivery date, that is, a date when the invoice should be transmitted to the customer. When an invoice delivery date is reached, the BSP delivers the transformed bill to the consolidator/iCSP (InvoiceDeliveryRequest) (step 525). Alternatively, if no invoice delivery date is associated with the invoice, the BSP may deliver the transformed bill to the consolidator/iCSP immediately or at periodically scheduled times. Additionally, the BSP may submit to the consolidator/iCSP information on the integration status of the biller (for example, BillerPreferences, I-Summary, I-Details). This information may be used by the consolidator/iCSP to perform operations on the received transformed bill. For example, the consolidator/iCSP may use such information when processing a request for credit, determining the status of a bill (such as, for example, if a bill has been delivered or paid), or in processing other types of inquiries related to the billing process such as dispute resolution. The consolidator/iCSP may indicate to the BSP that a transformed bill is available for access by the customer (by, for example, sending an InvoiceDeliveryResponse) (step 530). The BSP may then change the status of the bill to indicate that it is ready to be delivered (step 535). The consolidator/iCSP may then change the status of the received transformed bill to indicate that it is ready to be opened (step 540).

At this point, the next steps in the process may depend on certain factors such as whether the customer is a web customer or an ERP customer, whether payment preferences are applicable to the specific customer, or on the connection status of the biller's and customer's PSP. In certain embodiments, web presentment and payment may be handled using a banking portal (CCX IF), an Internet Service Provider (ISP) and a PSP, an ERP connection and payment using a payment channel, or an ERP connection and payment using an SAP EBPP system.

In step 545, the bill is "delivered" to the customer. "Delivery" may involve the consolidator/iCSP transmitting the bill to the customer or the customer retrieving the bill. For example, in certain embodiments, the customer may access the transformed bill via a web portal on the consolidator/iCSP data base. In certain embodiments, the process may involve additional optional steps such as verifying the invoice, cross-checking the information in the invoice with materials management information, or checking with payment processing systems.

In step 550, a payment order is sent to the consolidator/iCSP. In certain embodiments, the payment order may be digitally signed by the customer or other vouching entity. The consolidator/iCSP may then pass payment scheduling information to the BSP (SetEBPPStatusRequest) (step 555), which with BSP may use to schedule the payment (step 560). In certain embodiments, the BSP may mark the payment for immediate payment. The BSP may optionally inform the biller about the scheduled payment (step 562). Immediately or at a requested payment date, the consolidator/iCSP generates a payment order in a format required by the PSP and sends the payment order to the PSP (step 565). The payment order may be cryptographically authenticated. The PSP processes the payment, either a debit (570) or a credit (575) and may use interbank payment processing to do so, if required or desired. The consolidator/iCSP may optionally send a debit notice to the customer (step 580). The consolidator/iCSP may generate the debit notice in a format the customer requires and sends the message to the customer. The status of the transformed bill in the consolidator/iCSP is set to paid (step 585). The consolidator/iCSP may then send a credit notice to the biller. The consolidator/iCSP may generate a credit notice in a format requested by the biller and send that message together with a status change request to the BSP (SetEBPPStatusRequest) (step 590). The BSP may change the state of the bill to "paid" (step 595) and send a credit notice to the biller (step 598).

Figure 6:
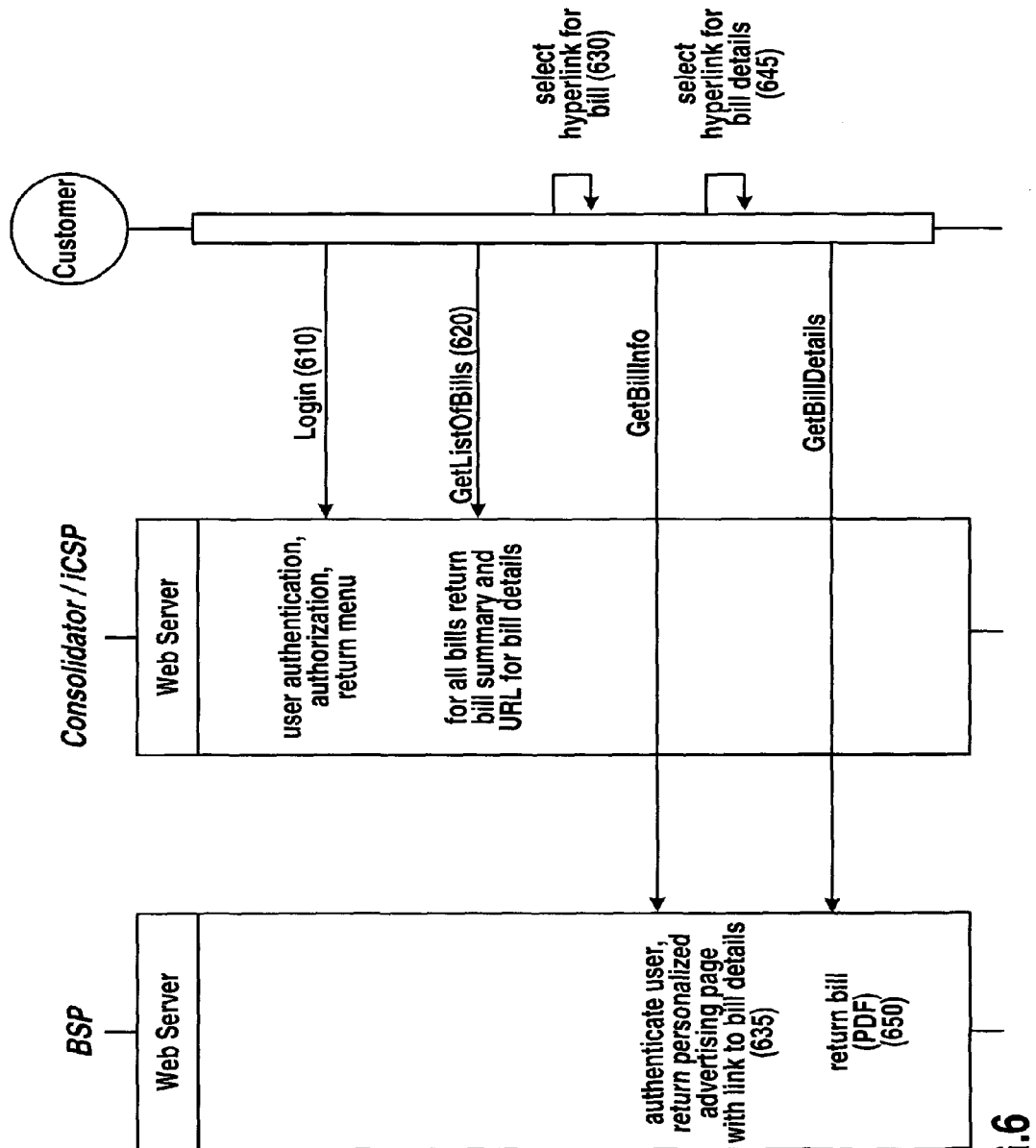
FIG. 6 is a flow diagram of an exemplary inventive bill presentment process consistent with the present invention.

FIG. 6 is a flow diagram of an exemplary inventive bill presentment process consistent with the present invention. The customer or a user logs in at the CSP/iCSP (step 610). The customer or user may use standard login procedures such as digital IDs (X.509), SSL, and/or client authentication. In certain embodiments, the distinguished name (DN) must be authorized for Web access in the master data of the consolidator/iCSP. The user may then select a client (customer) or, if the user has no clients, directly select the consolidated list of bills (GetListOfBills) of the customer for whom he has logged in (step 620). In response, the user may be able to access the following exemplary data relating to the bills: invoice reference, biller name, billers banking account, due date, amount with currency, business transaction (bill) state (such as "open," "dunning," "due," "scheduled," "paid," or "paid with different amount,"). In certain embodiments, the user may be able to select a hyperlink which will allow the user to access additional information relating to the bill (step 630). The hyperlink may redirect the user to an information page of the biller, normally hosted on the BSP. Such redirection may take place over a secure connection, such as one using SSL. As an alternative, the page can also be on a web server of the biller.

The BSP authenticates the customer (step 635). Authentication may be performed based on a token that may have been generated at the time the bill details were prepared and/or passed on as part of the bill summary which is passed back to the BSP together with the hyperlink. If the customer requested strong authentication, the bill may be presented only if the authentication matches one of the certificates, which may have been specified in the CustomerInfoResponse transmitted from the Consolidator/iCSP to the BSP in step 520 of FIG. 5. The BSP may maintain a number of HTML templates and may select a template based on the referenced business transaction (bill). The template may indicate business transaction data to be filled in. For example, the bill may be personalized with the biller's advertisements or advertisements of affiliated third parties. The third party advertisements to add may be chosen, for example, based on the customer information. For example, the customer's zip code may be used to select advertisements of third parties doing business in the customer's zip code. The generated HTML page comprises a hyperlink to the itemized bill. The customer selects the hyperlink to the itemized bill (step 645) and receives (after authentication) the bill (step 650). The bill may be, for example, in the PDF format.

Figure 7:
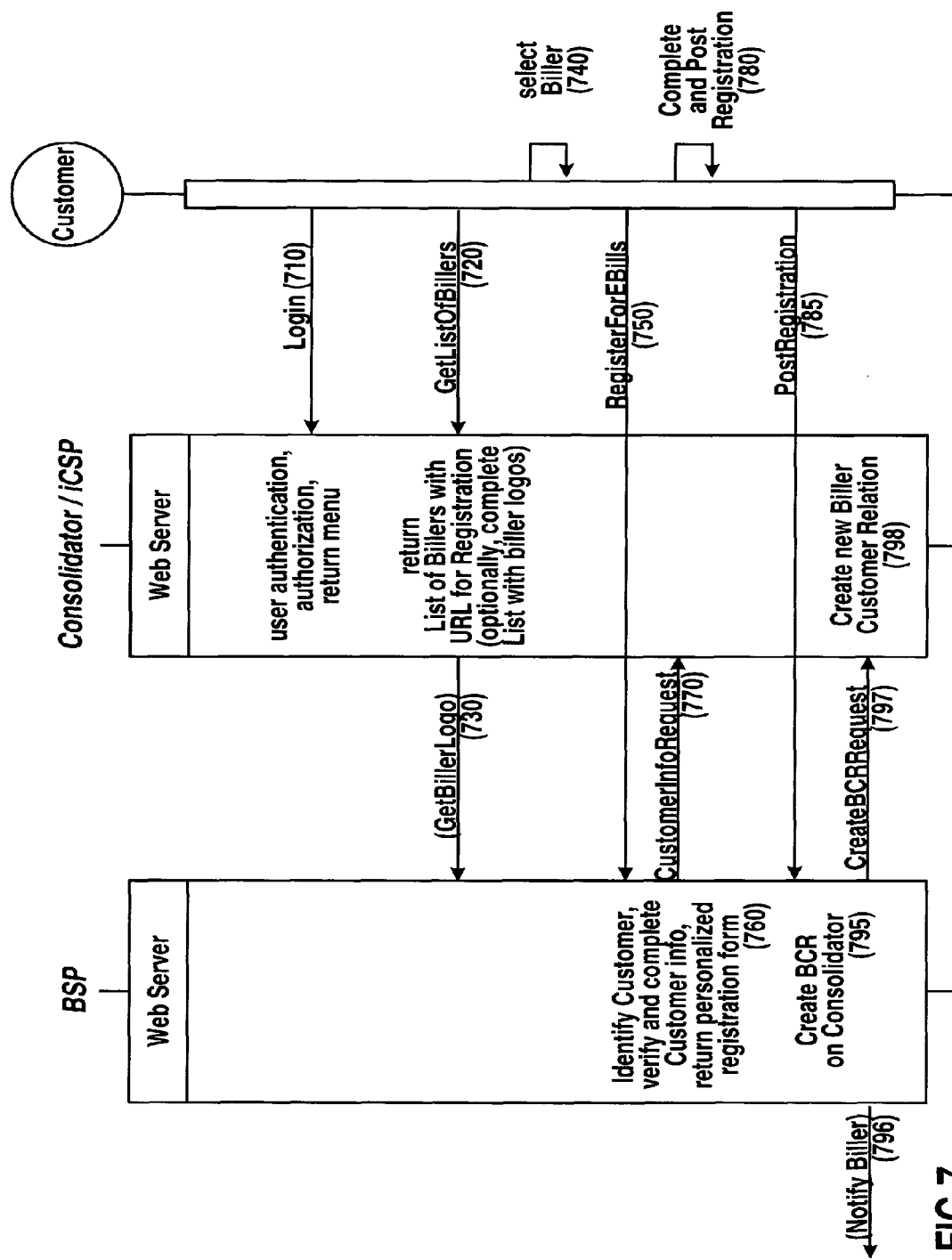
FIG. 7 is a flow diagram of an exemplary process for registering a customer for an inventive electronic billing process consistent with the present invention.

FIG. 7 is a flow diagram of an exemplary process for registering a customer for an electronic billing (e-billing)

process consistent with the present invention. The customer or a user logs in at the CSP/iCSP (step 710). The customer or user may use standard login procedures such as digital IDs (X.509), SSL, and/or client authentication. In certain embodiments, the DN must be authorized for Web access in the master data of the consolidator/iCSP. The user may then select a client (customer) or, if the user has no clients, directly select the consolidated list of bills (GetListOfBillers) (step 720). The consolidator/iCSP may possess an HTML template containing information of electronic billers. The list may be completed with logos and biller data from the BSP using hyperlinks (alternatively the data may be maintained locally on the consolidator) (step 730). The presented list also contains a customer registration status at the respective biller (inactive, active, registration_requested, registration_refused). The registration status may be stored, for example, in a BCR table (Biller Customer Relation) on the Consolidator.

The customer selects a biller (step 740). The URL for the registration form may redirect the customer to the BSP or to a Biller Web server (step 750). The BSP (or Biller Web server) identifies the customer, verifies and completes the customer information (step 760). The BSP may verify the customer and complete the customer information by, for example, obtaining a customer PID (Partner Identification Number) from the URL. If the customer cannot be authenticated, the BSP may get customer master data matching the received PID from the Consolidator. A personalized registration form (CustomerInfoRequest) may be transmitted to the Consolidator/iCSP (step 770).

A registration form is completed and posted (step 780). The registration form may be presented, for example, using biller-specific HTML templates and containing master data of the customer (not editable). The registration form may comprise buttons to register or cancel the registration. Additionally, other information such as the BCN (Biller's Customer Number or debtor number) may be included. If the customer processes the bill in an ERP system, the registration form may be extended by a field to allow entry of a CBN (Customer's Biller Number=creditor number). The customer completes the registration form and sends it back to the BSP (step 785). The BSP creates a BCR entry in the consolidator with, for example, the status "registration_requested" (step 795). The BSP may optionally notify the biller (such as by E-Mail) about the new registration (step 796). The BSP may also send information to the Consolidator/iCSP (in the form of, for example, a CreateBCRRequest) (step 797) which allows the Consolidator/iCSP to create a new BCR (step 798).

Figure 8:
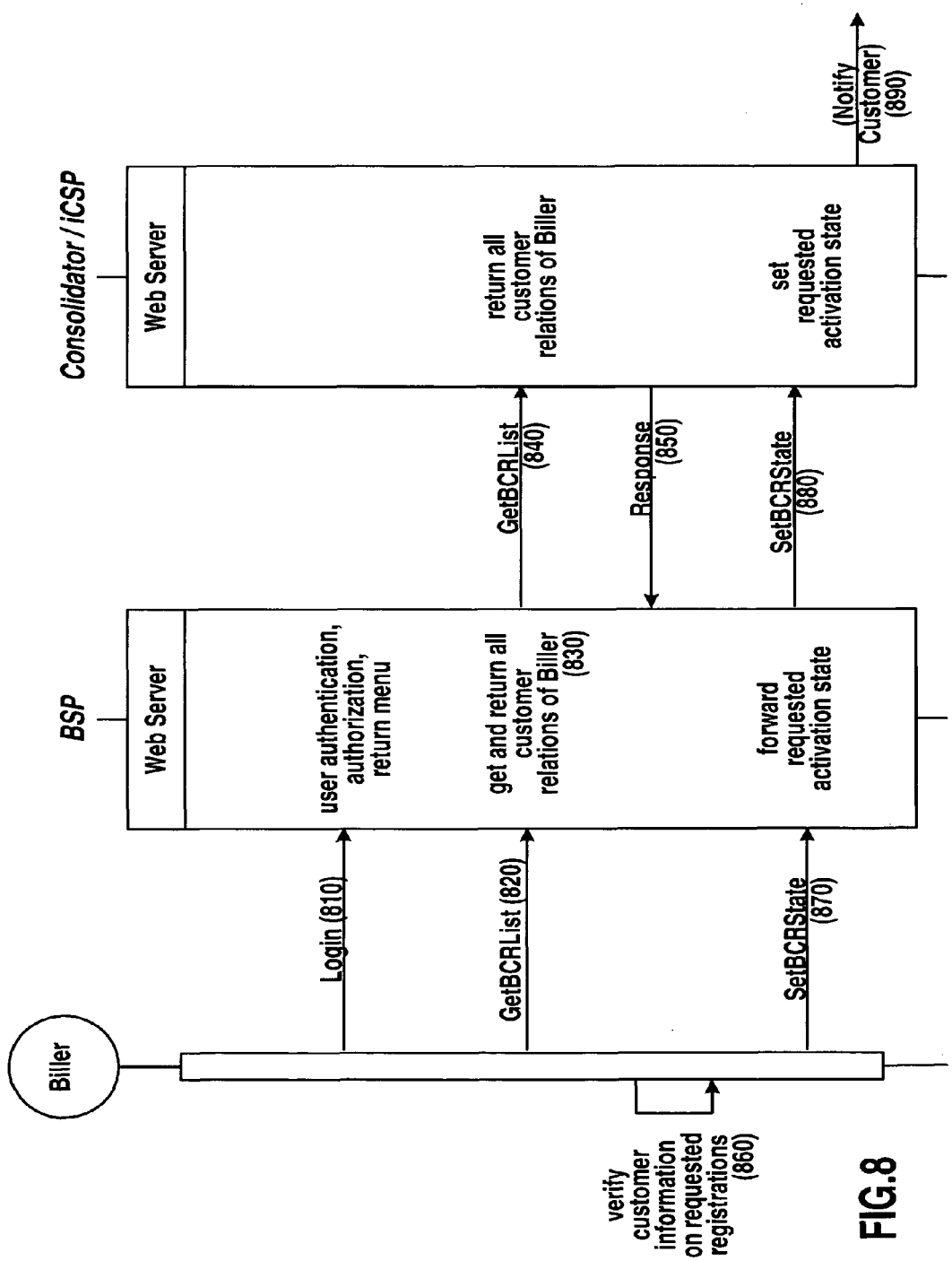
FIG. 8 is a flow diagram of an exemplary process for activating a registering of a customer by a biller consistent with the present invention.

FIG. 8 is a flow diagram of an exemplary process for activating a registering of a customer by a biller consistent with the present invention. The biller or a user logs in at the CSP/iCSP (step 810). The biller or user may use standard login procedures such as digital IDs (X.509), SSL, and/or client authentication. In certain embodiments, the DN must be authorized for Web access in the master data of the consolidator/iCSP. The user may then select a client (biller) and a request is sent to the BSP (GetBCRList) (step 820). If the user has no clients, the user may define filter criteria for getting a list of customers (step 830). The BSP sends a request onto the consolidator/iCSP (GetBCRList) (step 840). The BSP also processes the consolidator/iCSP's response (step 850) and presents a list of customers to the biller (step 830). The biller checks and verifies the customer information on requested registrations (step 860). For example, a mismatch in the BCN and the customer name should be avoided. If the registration data is correct, the biller may send an indication to the BSP to set the BCR status to active (step 870). The BSP may then set the BCR state on the consolidator/iCSP by, for example, transmitting to the consolidator/iCSP a SetBCRState request (step 880). After setting the proper state in the BCR table, the consolidator/iCSP may optionally notify the customer (such as by E-Mail) (step 890).

Figure 9:
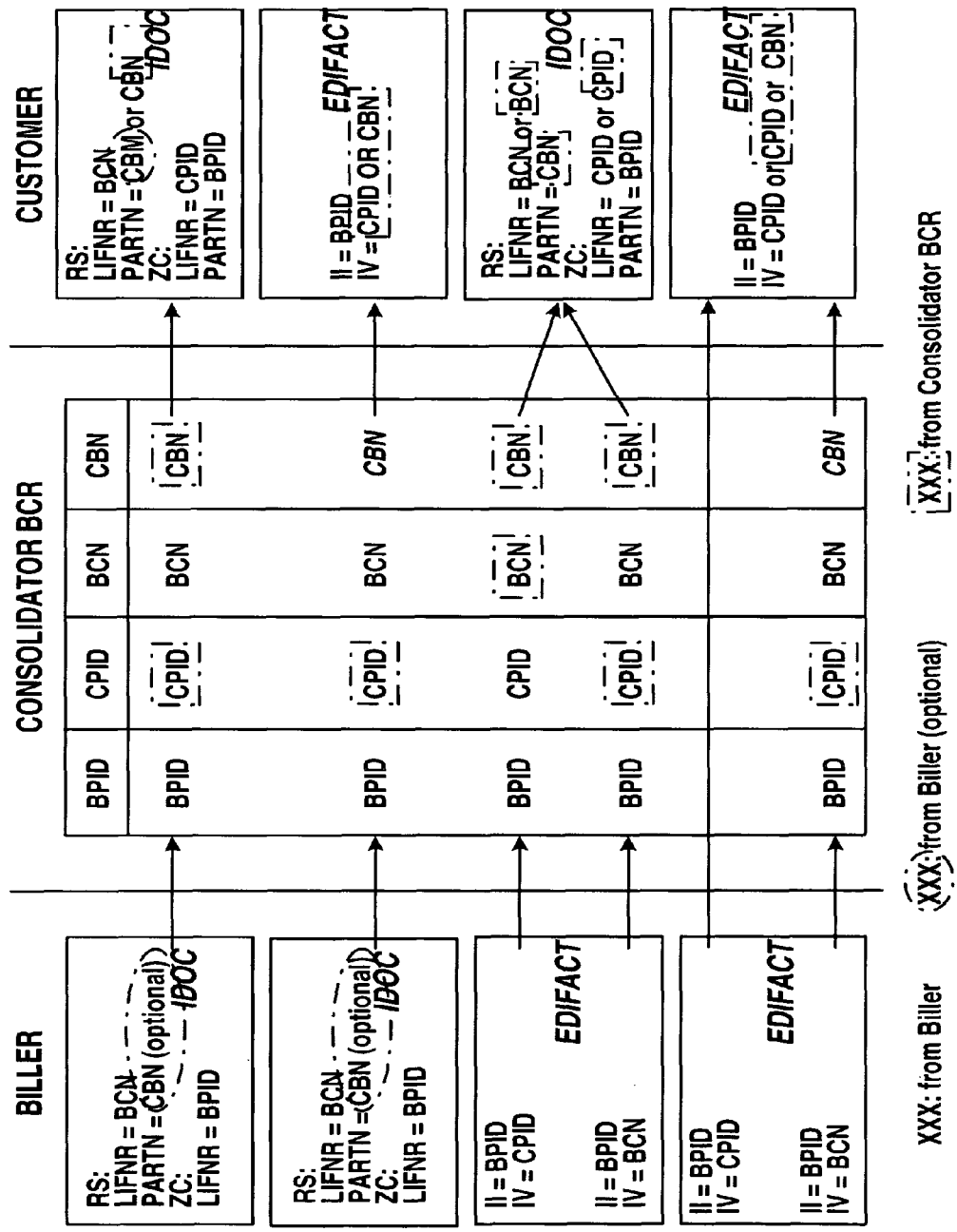
FIG. 9 is a block diagram of an exemplary table for mapping the IDs of a biller for a customer to the IDs of a customer for a biller.

FIG. 9 is a block diagram of an exemplary table for mapping the IDs of a biller for a customer to the IDs of a customer for a biller. Methods and systems consistent with the present invention facilitate the integration of Billers and Customers ERP systems. For example, a BCN (Billers Customer Number) or debtor number may be stored in the consolidator/iCSP system. This enables the Biller to use existing Customer identifications in billing data sent to the BSP. Expensive mappings can be reduced or avoided. Based on the information acquired in the customer registration process, the consolidator/iCSP can map the BCN to a unique Customer identification (e.g. the CPID, Customer Partner Identification).

In another example, the CBN (Customers Biller Number), a creditor number used in the customer's ERP system to identify the biller, may also be stored in the consolidator/iCSP during the customer registration process. This allows the BSP to map a BPID (Biller Partner Identification) directly to a Biller ID, known by the Customer ERP system during conversion on the BSP. Thus, in certain embodiments, the customer would not need to implement difficult and expensive mapping of IDs.

Figure 10:
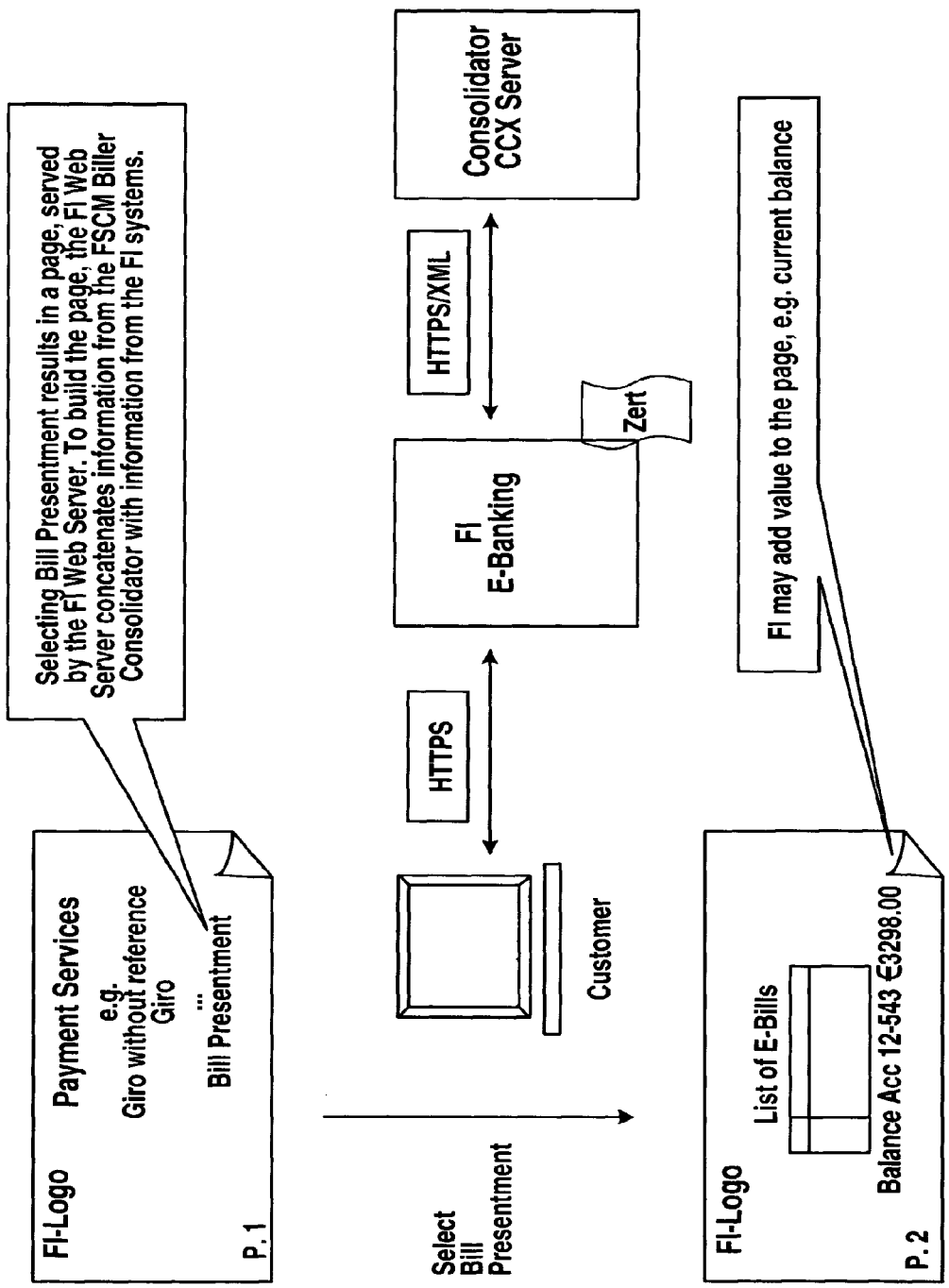
FIG. 10 is a block diagram showing integration of e-banking into an electronic bill presentment and paying system consistent with the present invention.

FIG. 10 is a block diagram showing integration of e-banking into an electronic bill presentment and paying system consistent with the present invention. E-Banking solutions can integrate bill presentment using, for example, a CCX (Consolidator CSP Exchange) interface. Customer may use multiple CSP's (Multi-banking). For example, the CSP can fetch the current list of bills at the consolidator/iCSP for presentment, instead of the bills being routed by the CSP. This would provide a customer with the ability to view and pay his bills from different CSP's (e.g. banks).

Figure 11:
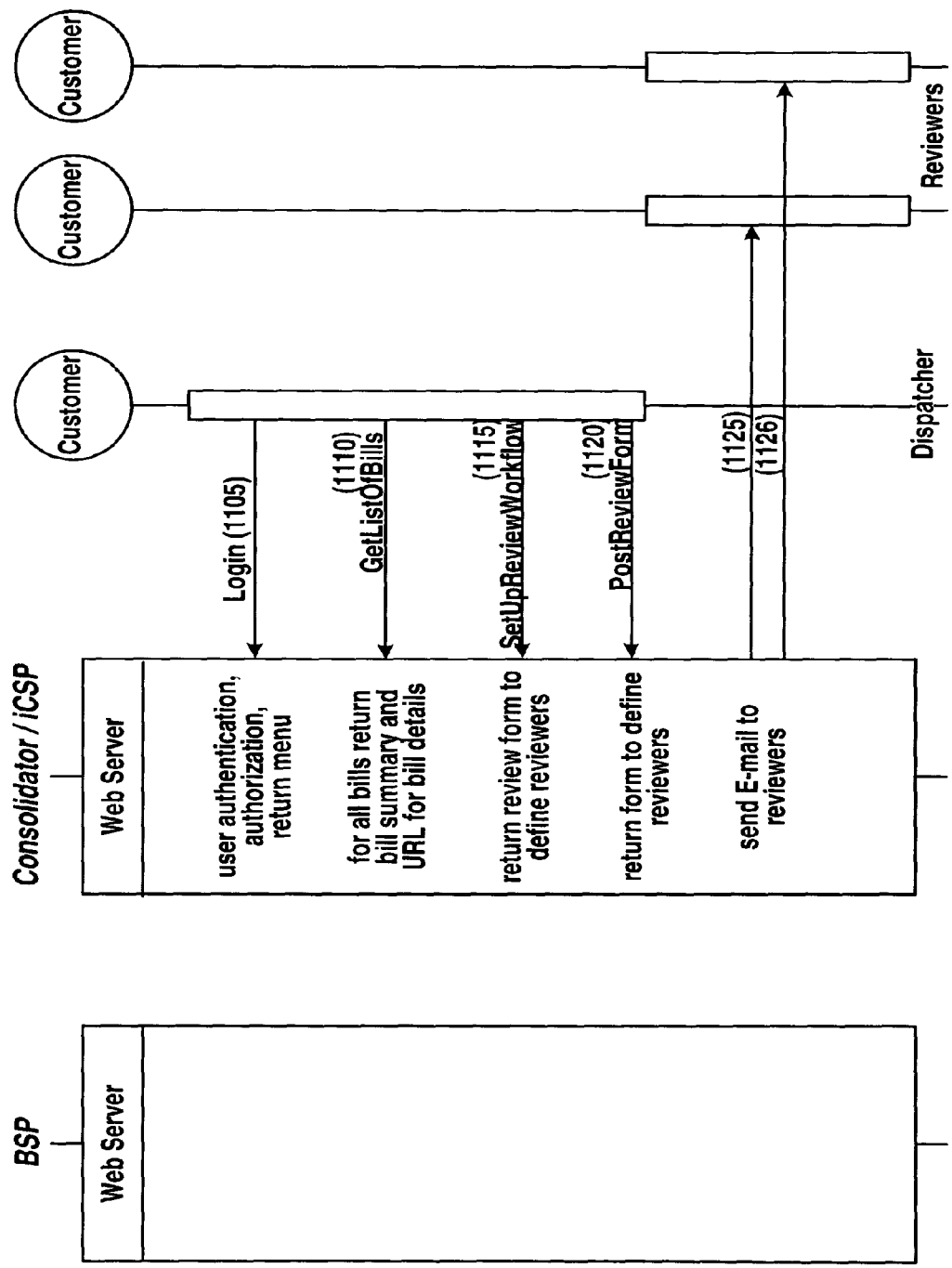
FIG. 11 is a flow diagram of an exemplary process for initiating and performing a bill review by a customer consistent with the present invention.
Figure 12:
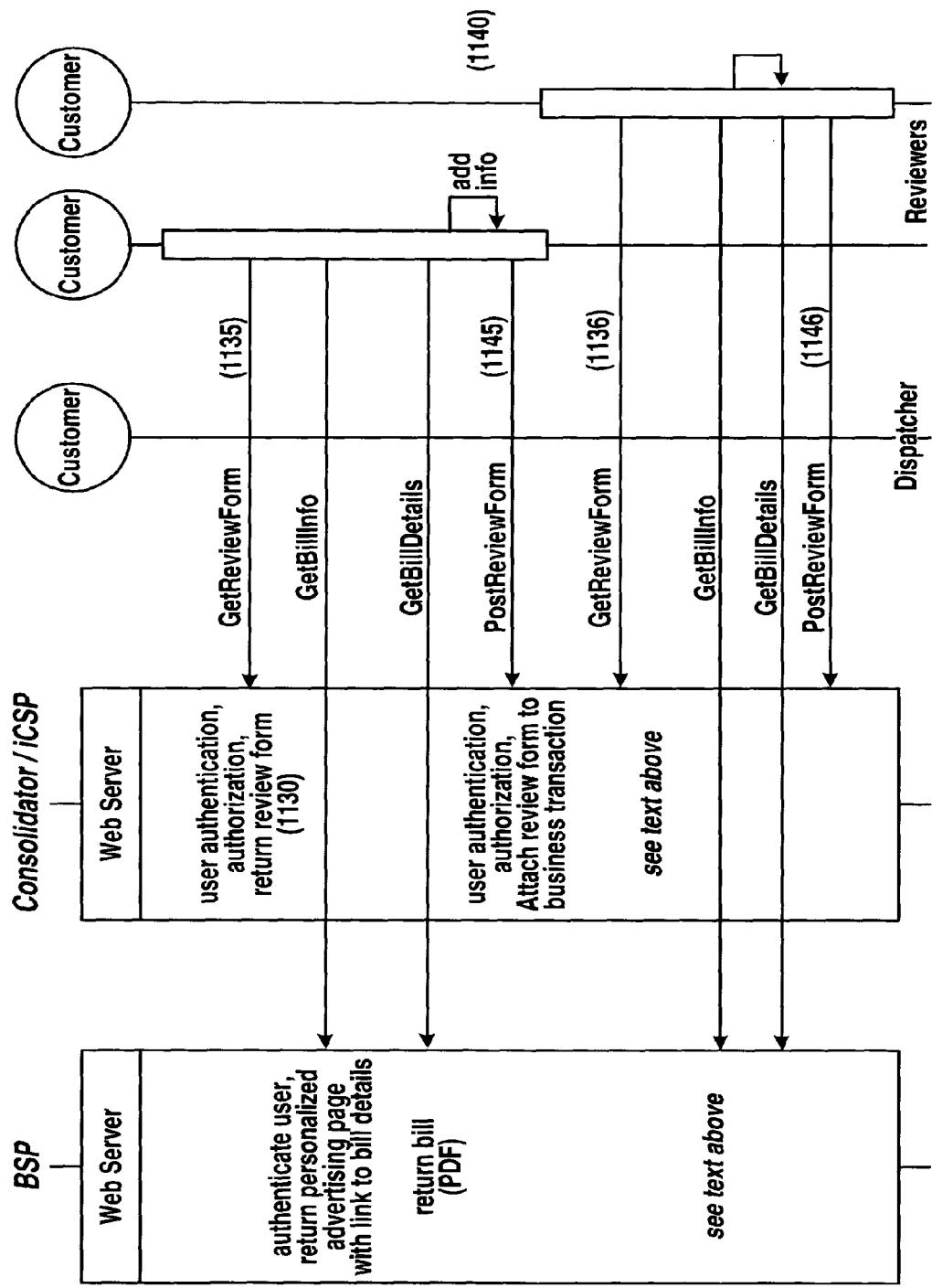
FIG. 12 is the continuation of the flow diagram in FIG. 11.

FIGS. 11 and 12 are a flow diagram of an exemplary process for initiating and performing a bill review by a customer consistent with the present invention. An employee of the customer, defined here as the dispatcher, may log in at the consolidator/iCSP (step 1105) and select one or more bills (step 1110). For bills not yet prepared for the review workflow, the dispatcher can select a SetUpReviewWorkflow (step 1115). The dispatcher may be presented with a form that allows the dispatcher to identify one or more reviewers. The dispatcher may identify one or more reviewers by, for example, entering a list of E-mail address (or aliases). The dispatcher can also enter other information, such as questions, or assign bill items. In parallel, the dispatcher can have the itemized bill presented.

The dispatcher sends the form back to the consolidator/iCSP (PostReviewForm) (step 1120). Based on the information provided, the consolidator/iCSP may send an E-mail to each of the indicated reviewers (steps 1125, 1126). For additional security, the email may be transmitted using encryption or a private (in-house) network). The email may contain a hyperlink (URL) to the work item review bill and a short (customizable) description. Optionally, the email may contain an authentication token. The status of the business transaction is changed to "bill review".

The E-mail receiver (the reviewer) may connect to the consolidator/iCSP by, for example, the URL listed in the E-mail. For additional security, the iCSP may authenticate the reviewer by, for example, using SSL client authentication (step 1130). The received certificate may, for example, be compared with authorized certificates in the master data. Alternatively, the consolidator/iCSP may authorize the user based on a token in the URL or authenticates the user based on another process, such as a user-id/password mechanism. The customer may receive the review form with additional data (steps (1135, 1136) The review form may also contains a hyperlink to additional bill information. The user may add comments and accounting information with respect to bill contents (step 1140). For example, the user may comment that certain positions were not received, other positions were ok, or provide instructions to charge to internal account No. XYZ.

The completed form is sent back to the consolidator/iCSP (PostReviewForm) (steps 1145, 1146). Other reviewers may process their workflow item in a similar way. The dispatcher or any other authorized user may access the review form via list of bills at any time. The system sends a message to a predefined address, once all reviewers have posted the review form and sets the state of the business transaction to "open" or "due" depending on the due date. The reviewers do not need to have access to any other bills or the list of bills. In certain embodiments, only the authentication/authorization has to be stored in the consolidator/iCSP. For example, for reviewers with digital IDs, only the reviewer's DN has to be stored combined with the right for bill reviews.

Figure 13:
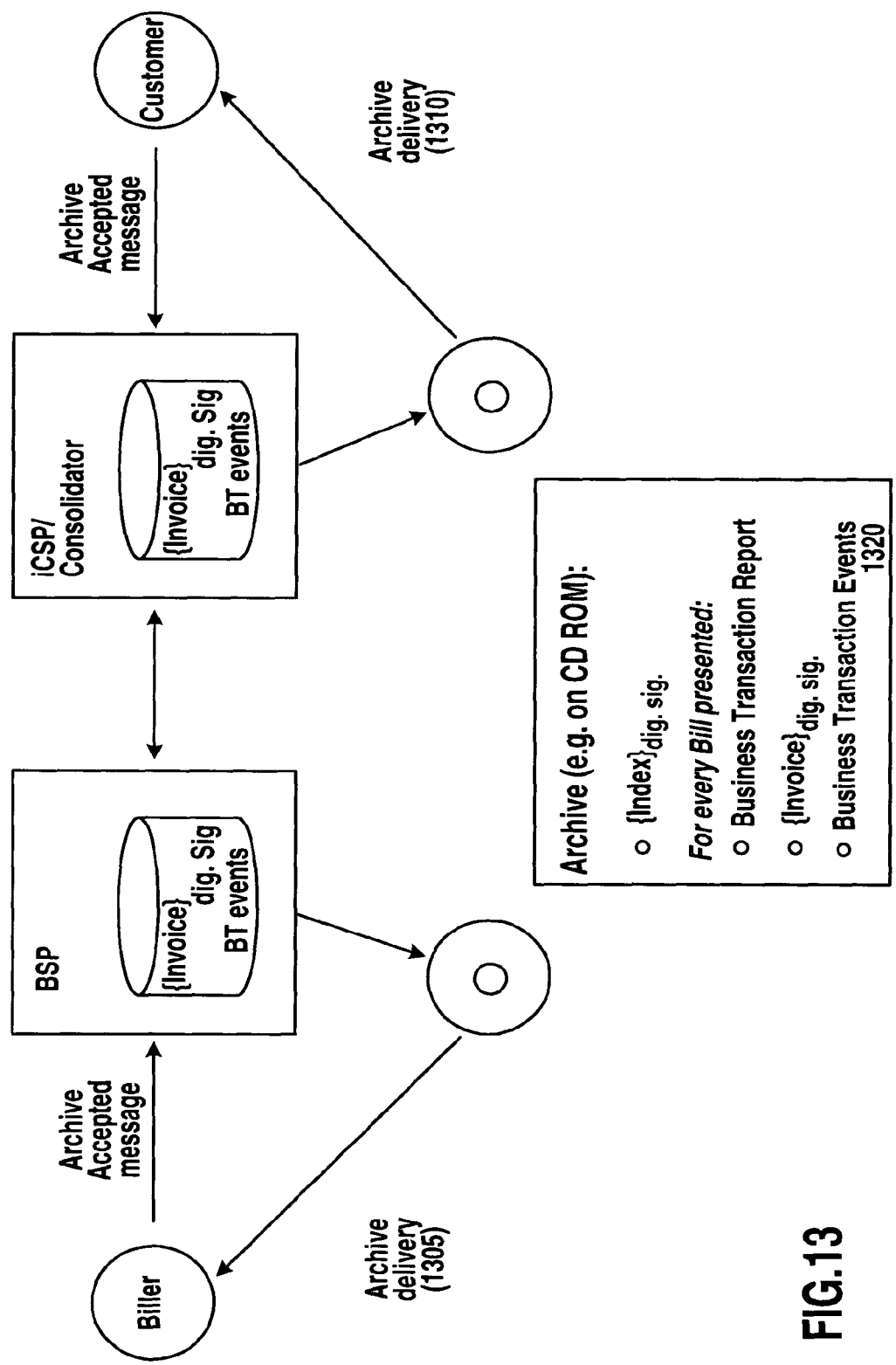
FIG. 13 is a block diagram of an exemplary archiving process for data of billers or customers.

FIG. 13 is a block diagram of an exemplary archiving process for data of billers or customers. As shown in FIG. 13, an archive may be delivered to the biller or the biller may retrieve an archive (step 1305). The archive may be in the form of a CD, DVD ROM, or another storage medium containing a record of the biller's business transactions (bills) with the BSP. An archive may also be delivered to the customer or the customer may receive an archive containing a record of the customer's business transactions with the consolidator/iCSP (step 1310). The PSP and a support organization may also receive an archive, containing their own data.

As shown in FIG. 13, archive 1320 may comprise, for example, an index. The index may contain, for example, bill summaries of the business transactions in the archive. Archive 1320 may also comprise a business transaction report which may contain, for example, a bill summary, a history of all business transaction events, and hyperlinks to the original messages.

The index may be digitally signed by, for example, the BSP and/or the Consolidator/iCSP. Digital signatures help to ascertain that the archive content has not been altered. Exchanged messages, such as the invoice, may also be digitally signed.

Optionally, other cryptographic mechanisms may be applied to avoid any changes of the content of the archive. The archive may be devilvered to or retrieved periodically, according to the requirements of the biller or customer. In certain embodiments, the receiver may confirm readability of a received archive by sending a message indicating receipt and acceptance. In certain embodiments, business transactions may be removed from the BSP and/or consolidator/iCSP after certain conditions have been met, such as receiving all necessary acceptance messages or after a configurable number of days. In certain embodiments, the archived data should be structured so as to meet the requirements of local state or federal regulations, such as those required for the reimbursement of VAT.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by ® Java, C++, HTML, XML, or HTML with included Java applets or in SAP R/3 or ABAP. One or more of such modules can be integrated in existing e-mail or browser software.

What is claimed is:

1. A computer-implemented method for processing bills electronically, wherein a transformed bill is created for a customer using billing information, master data of a biller, and master data of the customer, the method comprising:

receiving, by a biller service provider computer, the billing information from the biller, the biller service provider computer having direct access to the master data of the biller and the biller service provider computer not having direct access to the master data of the customer;

generating a bill, by the biller service provider computer, using the billing information and the master data of the biller;

transmitting, by the biller service provider computer, the bill to a consolidator computer, wherein the consolidator computer has direct access to the master data of the customer and the consolidator computer does not have direct access to the master data of the biller; and transforming, by the consolidator computer, the bill into a presentment format specified in the master data of the customer using the bill and the master data of the customer.

2. The method of claim 1, further comprising making the transformed bill accessible to the customer by a customer service provider.

3. The method of claim 1, further comprising presenting, by the consolidator computer, the transformed bill to the customer.

4. The method of claim 1, further comprising presenting or delivering the transformed bill to the customer.

5. The method of claim 1, further comprising digitally signing the transformed bill by the biller service provider computer.

6. The method of claim 4, further comprising encrypting the transformed bill by the biller service provider computer and/or consolidator computer before presenting or delivering the transformed bill to the customer.

7. The method of claim 1, further comprising archiving the transformed bill by the biller service provider computer and/or consolidator computer.

8. The method of claim 2, further comprising presenting an overview of the customer's bills by the customer service provider.

9. The method of claim 2, further comprising verifying the transformed bill by the customer service provider.

10. The method of claim 1, further comprising receiving, by the consolidator computer, a payment order from the customer.

11. The method of claim 10, wherein the consolidator computer forwards the payment order or a transformed payment order to a payment service provider.

12. The method of claim 1, wherein the billing information comprises one or more of information related to the biller, information related to the customer, information related to a payment supplier, payment information, Value Added Tax (VAT) information, itemized billing positions with relation to purchase order, and accounting information.

13. The method of claim 1, wherein the master data of the biller comprises one or more of address information, data format information, information on communication addresses, bank and bank account information, user authentication information, user authorizations information, information on options for archiving services, options for print services, and options for notifications.

14. The method of claim 1, wherein the master data of the customer comprise one or more of address information, data format information, communication addresses, bank and bank account information, user authentication information, user authorizations, information on options for archiving services, and options for notifications.

15. The method of claim 1, further comprising directly transforming the bill from a format used by the biller into a format as specified in the master data of the customer without using an intermediate format.

16. The method of claim 1, further comprising providing a verification mechanism for the customer to verify whether the biller service provider computer has the authority to generate bills for the customer.

17. The method of claim 1, further comprising registering the customer, wherein registering the customer comprises:
receiving, from the customer, a selection of the biller;
recording a registration relationship between the customer and the biller, based on which the customer can receive bills from the biller.

18. The method of claim 17, wherein registering the customer further comprises providing a list of billers which includes information about the biller to the customer to enable the customer to select the biller.

19. The method of claim 17, wherein registering the customer further comprises forwarding the registration relationship to the biller and receiving, from the biller, an indication to activate the relationship between the biller and the customer.

20. A non-transitory computer readable medium encoded with a computer program product, wherein the computer program product, when executed by a computer, causes the computer to perform the computer-implemented method of claim 1.

* * * * *